United States Patent [19]
Edinberry et al.

[11] 3,911,008
[45] Oct. 7, 1975

[54] POLAR-SUBSTITUTED PROPANOLAMINES AS ANTI-ANGINA AND ANTI-HYPERTENSIVE AGENTS

[75] Inventors: Michael N. Edinberry, Dover; Grant W. McLay, Sandwich, both of England

[73] Assignee: Pfizer Inc., New York, N.Y.

[22] Filed: Aug. 15, 1974

[21] Appl. No.: 497,625

[30] Foreign Application Priority Data
Aug. 18, 1973  United Kingdom............... 39162/73

[52] U.S. Cl....... 260/559 A; 260/559 H; 260/562 A

[51] Int. Cl.$^2$..................................... C07C 103/28
[58] Field of Search......... 260/559 A, 562 A, 562 N

[56] References Cited
UNITED STATES PATENTS

| | | | |
|---|---|---|---|
| 3,676,493 | 7/1972 | Smith............................. | 260/559 A |
| 3,723,524 | 3/1973 | Augstein et al................. | 260/559 A |
| 3,852,468 | 12/1974 | Howe et al...................... | 260/562 A |

*Primary Examiner*—C. Davis
*Attorney, Agent, or Firm*—Connolly and Hutz

[57] ABSTRACT

A novel process for the synthesis of substituted propanolamines from N-substituted aziridines.

5 Claims, No Drawings

POLAR-SUBSTITUTED PROPANOLAMINES AS ANTI-ANGINA AND ANTI-HYPERTENSIVE AGENTS

BACKGROUND OF THE INVENTION

This invention relates to a novel process for the preparation propanolamine propanolamine derivatives which have useful therapeutic properties, and is particularly concerned with preparation of 3-phenoxy-1-phenoxyalkylamino-2-propanols in which the phenyl group of the 1-substituent carries an electron-withdrawing polar substituent, and analagous compounds in which one of the phenyl groups is replaced by a naphthyl group. The compounds produced by the process of the invention are useful in the curative or prophylyactic treatment of cardiac conditions, such as angina pectoris and cardiac arrhythmias, and in the treatment of hypertension. Angina pectoris and cardiac arrhythmias (irregular heart beat) are due to interference with the blood supply to the heart muscle.

This invention relates to a process for preparing propanolamine derivatives of the kind described and claimed in British Pat. No. 1,245,148.

SUMMARY OF THE INVENTION

This invention relates to a process for preparing propanolamine derivatives of the formula:

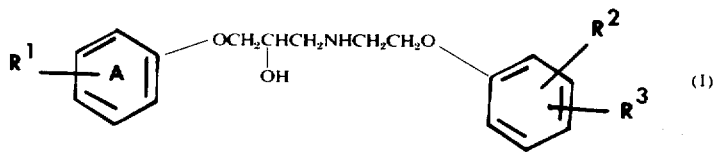

wherein $R^1$ is hydrogen or halogen atom, or a lower alkyl, lower alkenyl, lower alkoxy or lower alkenoxy group; $R^3$ is a hydrogen or halogen atom, or a lower alkyl or lower alkoxy group; $R^2$ is an electron-withdrawing polar substituent selected from the group consisting of $CONR^9R^{10}$ and $CONHNR^9R^{10}$ wherein $R^9$ and $R^{10}$ are each hydrogen or lower alkyl; and wherein benzene ring A may be replaced by a naphthalene ring; which process comprises reacting an N-substituted aziridine of the formula:

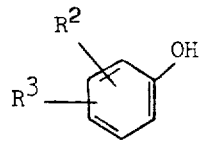

with a substituted phenol of the formula:

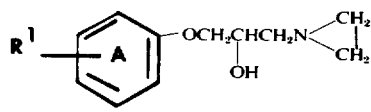

in a reaction inert solvent at a temperature of from about 20° to the reflux temperature of the solvent until reaction is substantially complete and isolating the resulting product.

A preferred embodiment of the above process is one in which the reaction is carried out in a reaction inert solvent in the presence of a basic or acidic catalyst using approximately equimolar proportions of the reactants at a temperature of from 20°C to the reflux temperature of the solvent for from 2 to 24 hours.

Especially preferred is a process as defined above wherein the solvent is amyl alcohol and the catalyst is triethylamine and the reaction is carried out at reflux temperature.

Another especially preferred embodiment is that defined above wherein said N-substituted aziridine is 1-[2-hydroxy-3-(2-tolyloxy) propyl]aziridine and said substituted phenol is p-hydroxybenzamide.

Still another preferred embodiment is the process defined above wherein said N-substituted aziridine is 1-[2-hydroxy-3-(2-methoxyphenoxy)propyl]aziridine and said substituted phenol is p-hydroxybenzamide.

DETAILED DESCRIPTION OF THE INVENTION

The present invention provides a process for preparing propanolamine derivatives of the formula:

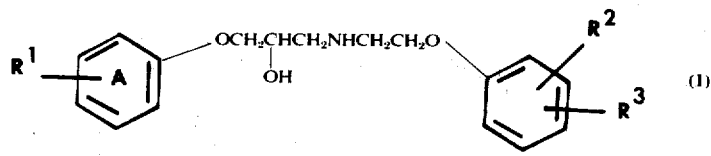

wherein $R^1$ is hydrogen or halogen atom, or a lower alkyl, lower alkenyl, lower alkoxy or lower alkenoxy group; $R^3$ is a hydrogen or halogen atom, or a lower alkyl or lower alkoxy group; $R^2$ is an electron-withdrawing polar substituent selected from the group consisting of $CONR^9R^{10}$ and $CONHNR^9R^{10}$, where $R^9$ and $R^{10}$ are hydrogen or lower alkyl, and wherein benzene ring A may be replaced by a naphthalene ring; which process comprises reacting an N-substituted aziridine of the formula:

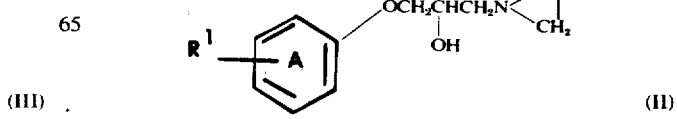

with a substituted phenol of the formula:

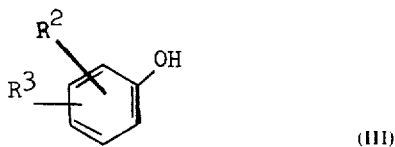

(III)

The starting material for the process of the present invention, i.e. the N-substituted aziridine of formula (II) may be formed by reacting an epoxy-compound of the formula:

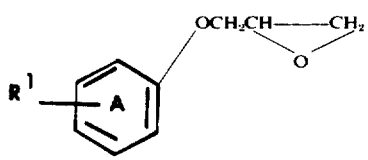

with ethylene imine. This reaction is described for example in British Pat. No. 1,131,798, but the only compound of the formula (II) disclosed therein is the compound in which $R^1$ is hydrogen. The further reaction of the compound with phenols is not described therein.

The process of the present invention may be carried out by reacting the aziridine compound of formula (II) with the substituted phenol in a variety of protic and aprotic solvents, including: methanol, ethanol, n-propanol, iso-propanol, n-butanol, amyl alcohol, ethylene glycol, diethylene glycol and 2-methoxyethanol (including mixtures of these with each other or with water); toluene, xylene, o-dichlorobenzene, methyl ethyl ketone, methyl isobutyl ketone, dimethylacetamide, dimethylformamide or hexamethylphosphoramide; or water; or in the absence of a solvent. Especially preferred is the use of amyl alcohol as a solvent. The yields of the process of the present invention are often improved by the addition of an acidic or basic catalyst.

Suitable basic catalysts include tertiary amines, e.g. triethylamine, pyridine or N,N-dimethyl aniline; alkali metal hydroxides or carbonates, e.g. sodium hydroxide or potassium carbonate; quaternary ammonium compounds, such as benzyltrimethyl ammonium hydroxide or bromide; or even alkali metal salts of the substituted phenol of formula (III). Suitable acid catalysts include organic acids, e.g. acetic or citric acid, and inorganic acids, e.g. hydrochloric or sulphuric acid. The catalyst most frequently employed is triethyl amine.

The reaction may be carried out using approximately equimolar proportions of the reagents at temperatures from room temperature (about 20°C) to the reflux temperature of the particular solvent used. Obviously the higher the temperature used the more quickly will the reaction be completed, but usually reaction times of 2 to 24 hours and reaction temperatures of from 50° to 150°C are preferred.

The product of the reaction under basic conditions will normally be the free base which may be converted to a suitable salt, e.g. the hydrochloride, by treatment of a solution of the base in a suitable solvent, e.g. ethanol, with concentrated hydrochloric acid or hydrogen chloride gas.

The utility and method of use of the compounds produced by the process of the present invention are further discussed in U.S. Pat. No. 3,723,524 issued Mar. 27, 1973.

The term "lower" applied herein to an alkyl, alkenyl, alkoxy or alkenoxy group means that any such group may contain up to four carbon atoms, i.e. it may be a methyl, ethyl, n-propyl, isopropyl or butyl group, a vinyl, allyl, propenyl or butenyl group or any corresponding alkoxy or alkenoxy group.

The process of the invention is illustrated but not limited by the following examples:

EXAMPLE I

Stage I: Preparation of 1-[2-hydroxy-3-(2-tolyloxy)propyl]aziridine

A mixture of 1,2-epoxy-3-(2-tolyloxy)propane (65.6 g) ethylenimine (68.8 g) and water (2.4 ml) was stirred at room temperature for 24 hrs., then diluted with benzene (150 ml) and the solution washed with water. After drying, the solvent was removed under reduced pressure to afford 1-[2-hydroxy-3-(2-tolyloxy)propyl]aziridine as an oil (81.0 g), which slowly solidified on standing at 0°C. This material was used without purification in the next stage.

Stage II: Preparation of 4-[2-(2-hydroxy-3-{2-tolyloxy}propylamino) ethoxy]benzamide hydrochloride A mixture of p-hydroxybenzamide (10.96 g), 1-[2-hydroxy-3-(2-tolyloxy)propyl]aziridine (24.8 g) and triethylamine (8.08 g), in amyl alcohol (100 ml) was refluxed for 20 hrs., then cooled to 5°C and the resultant precipitate filtered off and dried to afford the crude base (17.86 g). Treatment of a refluxing aqueous ethanolic solution of this material with concentrated hydrochloric acid afforded 10.3 g of 4-[2-(2-hydroxy-3-{2-tolyloxy}propylamino)ethoxy]benzamide hydrochloride (m.p. 234°–236°C) in 37% yield after recrystallization from aqueous ethanol, with infra-red spectrum identical to that of a reference sample.

EXAMPLE II

Stage I: Preparation of 1-[2-hydroxy-3-(2-methoxyphenoxy)propyl]aziridine 1,2-Epoxy-3-(2-methoxyphenoxy)propane (4.5 g; 0.025M), ethylenimine (4.3 g; 0.1M) and water (0.6 ml.) were added to amyl alcohol (18 ml.) and stirred at room temperature for 20 hours. The solution was washed with brine, the organic layer separated and the solvent removed by evaporation under reduced pressure to afford the product as a colorless oil (4.81 g; 86.2% yield). This material was used without purification in the next stage.

Stage II: Preparation of 4-[2-(2-hydroxy-3-(2-methoxyphenoxy)propylamino)ethoxy]benzamide To a solution of p-hydroxybenzamide (1.8 g; 0.013 1M) in warm amyl alcohol (10 ml.) containing triethylamine (1.32 g; 0.013 1M) was added a solution of 1-[2-hydroxy-3-(2-methoxyphenoxy) propyl]aziridine (4.4 g; 0.0197M) in amyl alcohol (20 ml.). After heating under reflux for 18 hours the mixture was cooled to room temperature, washed with 5N aqueous sodium hydroxide solution, and then brine, and the organic layer dried over magnesium sulphate. The drying agent was removed by filtration, the filtrate cooled to 0°C and the crystalline solid collected, washed with a little I.M.S. and dried. Crude yield 3.3 g (70%). Recrystallization from I.M.S. with carbon treatment gave 4-[2-(2-hydroxy-3-{2-methoxyphenoxy}propylamino)ethoxy]-benzamide, (1.42 g; 30% yield), m.p. 134°–137°C, with infra-red spectrum identical to that of a reference sample.

What we claim is:

1. A process for preparing propanolamine derivatives of the formula:

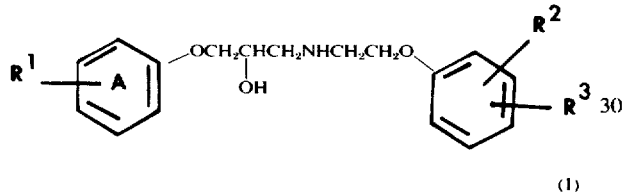

(I)

wherein $R^1$ is hydrogen or halogen atom, or a lower alkyl, lower alkenyl, lower alkoxy or lower alkenoxy group; $R^3$ is a hydrogen or halogen atom, or a lower alkyl or lower alkoxy group; $R^2$ is an electron-withdrawing polar substituent selected from the group consisting of $CONR^9R^{10}$ and $CONHNR^9R^{10}$ wherein $R^9$ and $R^{10}$ are each hydrogen or lower alkyl; and wherein benzene ring A may be replaced by a naphthalene ring; which process comprises reacting an N-substituted aziridine of the formula:

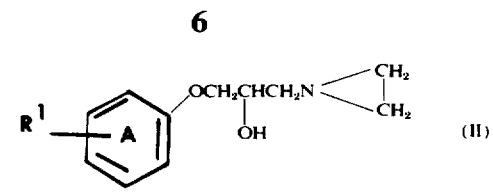

(II)

with a substituted phenol of the formula:

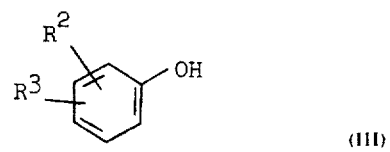

(III)

in a reaction inert solvent at a temperature of from about 20° to the reflux temperature of the solvent until reaction is substantially complete, and isolating the resulting product.

2. The process of claim 1 in which the reaction is carried out in a reaction inert solvent in the presence of a basic or acidic catalyst using approximately equimolar proportions of the reactants at a temperature of from 20° to 150°C for from 2 to 24 hours.

3. A process as claimed in claim 2, wherein the solvent is amyl alcohol and the catalyst is triethylamine and the reaction is carried out at reflux temperature.

4. The process of claim 3 wherein said N-substituted aziridine is 1-[2-hydroxy-3-(2-tolyloxy)propyl]aziridine and said substituted phenol is p-hydroxybenzamide.

5. The process of claim 3 wherein said N-substituted aziridine is 1-[2-hydroxy-3-(2-methoxyphenoxy)-propyl]aziridine and said substituted phenol is p-hydroxybenzamide.

* * * * *

Dedication 3,911,008.—*Michael N. Edinberry*, Dover, and *Grant W. McLay*, Sandwich, England. POLAR-SUBSTITUTED PROPANOLAMINES AS ANTI-ANGINA AND ANTI-HYPERTENSIVE AGENTS. Patent dated Oct. 7, 1975. Dedication filed Dec. 2, 1975, by the assignee, *Pfizer Inc.*

Hereby dedicates to the Public the entire term of said patent.

[*Official Gazette February 10, 1976.*]